United States Patent
Ikemoto (10) Patent No.: US 8,205,438 B2
(45) Date of Patent: Jun. 26, 2012

(54) CATALYST WARMING-UP CONTROL DEVICE

(75) Inventor: Noriaki Ikemoto, Kariya (JP)

(73) Assignee: Denso Corporation, Kariya City (JP)

( * ) Notice: Subject to any disclaimer, the term of this patent is extended or adjusted under 35 U.S.C. 154(b) by 462 days.

(21) Appl. No.: 12/484,289

(22) Filed: Jun. 15, 2009

(65) Prior Publication Data

US 2009/0308059 A1    Dec. 17, 2009

(30) Foreign Application Priority Data

Jun. 17, 2008  (JP) ................................. 2008-157373

(51) Int. Cl.
F01N 3/00    (2006.01)
(52) U.S. Cl. ................. 60/284; 60/274; 60/286; 60/300
(58) Field of Classification Search ..................... 60/274, 60/284–286, 295–301
See application file for complete search history.

(56) References Cited

U.S. PATENT DOCUMENTS

| | | | | |
|---|---|---|---|---|
| 4,781,242 | A * | 11/1988 | Meijer et al. ................... | 165/273 |
| 5,044,423 | A * | 9/1991 | Schatz ............................. | 165/10 |
| 6,253,548 | B1 | 7/2001 | Ap et al. | |
| 6,318,077 | B1 * | 11/2001 | Claypole et al. ................ | 60/303 |
| 6,422,007 | B1 * | 7/2002 | Hartick ............................ | 60/298 |
| 6,871,489 | B2 * | 3/2005 | Tumati et al. ................... | 60/285 |
| 7,051,522 | B2 * | 5/2006 | Yang et al. ...................... | 60/320 |
| 7,178,332 | B2 * | 2/2007 | Sasaki ............................. | 60/320 |
| 2003/0005686 | A1 * | 1/2003 | Hartick ........................... | 60/298 |
| 2003/0118857 | A1 | 6/2003 | Kahl et al. | |
| 2003/0145583 | A1 | 8/2003 | Tanaka et al. | |
| 2009/0158707 | A1 * | 6/2009 | Baird et al. ..................... | 60/274 |

FOREIGN PATENT DOCUMENTS

| | | | |
|---|---|---|---|
| JP | 2000-054837 | | 2/2000 |
| JP | 2000054837 A | * | 2/2000 |
| JP | 2003-269146 | | 9/2003 |
| JP | 2005-016364 | | 1/2005 |
| JP | 2005016364 A | * | 1/2005 |
| JP | 2006-220020 | | 8/2006 |
| JP | 2007-154717 | | 6/2007 |

OTHER PUBLICATIONS

Japanese Office Action dated Aug. 24, 2010 issued in corresponding Japanese Application No. 2008-157373 with English Translation.

* cited by examiner

*Primary Examiner* — Thomas Denion
*Assistant Examiner* — Jesse Bogue
(74) *Attorney, Agent, or Firm* — Nixon & Vanderhye P.C.

(57) ABSTRACT

A catalyst is provided in an exhaust passage of an engine and an evaporating section of a heat recovery device is provided upstream of the catalyst in the exhaust passage. An ECU performs an operation for compulsorily oscillating an air-fuel ratio between a lean state and a rich state as compared to a theoretical air-fuel ratio when temperature of the catalyst reaches temperature at which the catalyst has a predetermined purification capacity after the engine is started. The ECU restricts a flow of a working fluid in the heat recovery device until the temperature of the catalyst reaches the temperature at which the catalyst has the predetermined purification capacity after the engine is started.

17 Claims, 5 Drawing Sheets

CATALYST WARMING-UP CONTROL DEVICE

CROSS REFERENCE TO RELATED APPLICATION

This application is based on and incorporates herein by reference Japanese Patent Application No. 2008-157373 filed on Jun. 17, 2008.

BACKGROUND OF THE INVENTION

1. Field of the Invention

The present invention relates to a catalyst warming-up control device for quickly warming up a catalyst.

2. Description of Related Art

Conventionally, a catalyst is provided in an exhaust passage of a vehicle mounted with an engine. The catalyst has the optimum temperature for purifying exhaust gas. Warming-up of the catalyst is performed using the exhaust gas when the temperature of the catalyst is lower than the temperature high enough to purify the exhaust gas, for example, soon after the engine is started.

There is a known construction that is provided with a heat exchanger of a heat recovery device in an exhaust passage to recover exhaust gas heat. The exhaust gas heat recovered through the heat exchanger is used for heating or for increasing temperature of an engine coolant, for example.

As for a relative positional relationship between the catalyst and the heat exchanger in the exhaust passage, there can be a construction that arranges the heat exchanger upstream of the catalyst. In this case, the recovery of the exhaust gas heat is performed in the heat exchanger before in the catalyst. Therefore, this construction can increase the recovered amount of the exhaust gas heat more than the construction that arranges the heat exchanger downstream of the catalyst, for example, when quick temperature increase of the coolant is required. For increasing the recovered amount of the exhaust gas heat as compared to the construction that arranges the heat exchanger downstream of the catalyst, a construction that arranges the heat exchanger at the same position as the catalyst can be also employed.

However, in the construction that arranges the heat exchanger at the same position as the catalyst or upstream of the catalyst as described above, the recovery of the exhaust gas heat is performed in the heat exchanger before in the catalyst. Therefore, there is a concern that the warming-up of the catalyst using the exhaust gas heat delays. In this regard, for example, Patent document 1 (JP-A-H11-218020) describes a construction that provides a bypass passage upstream of the catalyst for preventing the exhaust gas from flowing through the heat exchanger and that switches the flow of the exhaust gas between the heat exchanger side and the bypass passage side with a passage switching valve. Thus, the construction prioritizes either the warming-up of the catalyst or the recovery of the exhaust gas heat.

However, in the construction described in Patent document 1, the bypass passage and the passage switching valve are indispensable components, so restrictions are imposed on the construction of the exhaust passage.

SUMMARY OF THE INVENTION

It is an object of the present invention to provide a catalyst warming-up control device capable of quickly warming up a catalyst without imposing restrictions on a construction of an exhaust passage when the warming-up control device is applied to an engine system that performs recovery of exhaust gas heat at the same position as the catalyst or upstream of the catalyst.

According to an aspect of the present invention, a warming-up control device of a catalyst is applied to an engine system having a heat recovery device that circulates a working fluid through a predetermined circulation passage and that recovers exhaust gas heat via the working fluid at the same position as the catalyst or upstream of the catalyst in an exhaust passage of an engine The heat recovery device radiates the recovered heat to a temperature increase object. The warming-up control device has a determination device, a first control device and a second control device. The determination device determines whether a state where the catalyst enables a predetermined purification reaction is reached in the process of activation of the catalyst. The first control device starts control for promoting a reaction in the catalyst and for increasing catalytic reaction heat when it is determined that the state where the predetermined purification reaction is enabled is reached. The second control device restricts the flow of the working fluid in the heat recovery device to reduce heat recovery amount as compared to a case where the recovery of the exhaust gas heat is performed to raise the temperature of the temperature increase object to a predetermined temperature at least while it is determined that the state where the predetermined purification reaction is enabled is not reached.

With the above-described aspect of the present invention, the flow of the working fluid in the heat recovery device is restricted at least until the warming-up of the catalyst, which is performed by increasing the catalytic reaction heat, is started, Thus, the warming-up of the catalyst using the exhaust gas heat can be prioritized over the recovery of the exhaust gas heat in the heat recovery device. When the control for increasing the catalytic reaction heat by promoting the reaction in the catalyst is started, the influence over the warming-up of the catalyst can be reduced even if the recovery of the exhaust gas heat is performed in the heat recovery device and the temperature of the exhaust gas supplied to the catalyst decreases According to the above aspect, the warming-up of the catalyst is prioritized over the recovery of the exhaust gas heat performed by the heat recovery device by restricting the flow of the working fluid. Therefore, no restriction is imposed on the passage construction of the exhaust passage when prioritizing the warming-up of the catalyst.

According to another aspect of the present invention, at least while it is determined that the state where the predetermined purification reaction is enabled is not reached, the second control device restricts the flow of the working fluid while controlling the flow rate of the working fluid such that temperature or pressure of the working fluid at a heat recovery point in the circulation passage becomes equal to or lower than a limit value set in accordance with strength of the circulation passage at the heat recovery point.

The temperature of the working fluid at the heat recovery point approaches the temperature of the exhaust gas in the situation where the flow rate is restricted. The pressure of the working fluid increases at the heat recovery point as the temperature increases. In such the case, the burden applied to the members constituting the heat recovery point in the circulation passage and the like increases. In this regard, by restricting the flow of the working fluid to the range where the temperature or the pressure becomes equal to or lower than the limit value, the increase of the pressure of the working fluid at the heat recovery point can be suppressed in the predetermined range.

The temperature of the object of the temperature increase performed by the heat recovery device can be controlled suitably by using the temperature of the working fluid as the reference during the normal heat recovery. In this regard, by using the temperature of the working fluid as the reference also in the case where the flow of the working fluid is restricted, the above-described effect can be exerted by using software configuration and the like in the case of the normal heat recovery, As described above, the burden applied to the members constituting the heat recovery point in the circulation passage and the like increases as the pressure of the working fluid increases. Therefore, by using the pressure of the working fluid as the reference, the above-described burden can be suitably restricted to the predetermined range.

According to another aspect of the present invention, the second control device stops the flow of the working fluid when the temperature or the pressure of the working fluid at the heat recovery point is equal to or lower than the limit value in a state where the flow of the working fluid is restricted. Thus, in the construction that suppresses the increase of the pressure of the working fluid at the heat recovery point to the predetermined range, the heat recovery by the working fluid is restricted to the minimum, so the warming-up of the catalyst using the exhaust gas heat can be prioritized, According to another aspect of the present invention, the second control device starts control of the flow rate for conforming the temperature or the pressure of the working fluid at the heat recovery point to a predetermined target value lower than the limit value when it is determined that the state where the predetermined purification reaction is enabled is reached or in a period after it is determined that the state is reached and before the catalyst reaches an activated state.

Thus, when there occurs the situation where the influence of the exhaust gas heat recovery over the warming-up of the catalyst is reduced, the temperature of the working fluid at the heat recovery point is reduced and the pressure of the working fluid at the point is reduced correspondingly. Thus, as compared with the construction that restricts the flow of the working fluid until the catalyst reaches the activated state, the burden applied to the members constituting the heat recovery point in the circulation passage and the like is reduced. When the target value lower than the above-described limit value is set at the target value of the normal heat recovery, the timing at which the heat recovery device starts the recovery of the exhaust gas heat does not delay extremely as compared with the construction that restricts the flow of the working fluid until the catalyst reaches the activated state.

According to another aspect of the present invention, the second control device stops the flow of the working fluid at least while it is determined that the state where the predetermined purification reaction is enabled is not reached, Thus, the heat recovery from the exhaust gas via the working fluid is reduced to the minimum, so the warming-up of the catalyst using the exhaust gas heat can be prioritized.

According to another aspect of the present invention, the second control device switches from a state where the flow of the working fluid is restricted to a state where the flow of the working fluid is not restricted when it is determined that the state where the predetermined purification reaction is enabled is reached or in a period after it is determined that the state is reached and before the catalyst reaches an activated state. Thus, as compared with the construction that restricts the flow of the working fluid until the catalyst reaches the activated state, the timing when the recovery device starts the recover of the exhaust gas heat does not delay extremely. Moreover, the burden applied to the members constituting the heat recovery point in the circulation passage and the like can be suppressed.

According to another aspect of the present invention, the second control device switches from a state where the flow of the working fluid is restricted to a state where the flow of the working fluid is not restricted at timing after the first control device switches from a state before the reaction in the catalyst is promoted to a state where the reaction in the catalyst is promoted.

For example, if there is a construction that cancels the state of restricting the flow of the working fluid at the same timing as the timing for starting the warming-up with the first control device, there is a possibility that the catalyst once reaches the state where the catalyst has the predetermined purification capacity but the catalyst returns to the state where the predetermined purification reaction is not enabled due to the fall of the exhaust temperature accompanying the recovery of the exhaust gas heat before the warming-up using the reaction heat is started, so the warming-up using the reaction heat cannot be started suitably.

In this regard, the state of restricting the flow of the working fluid is cancelled at the timing after the timing when the first control device starts the warming-up. Accordingly, the warming-up using the reaction heat can be started suitably.

According to another aspect of the present invention, the warming-up control device further has a third control device for raising the temperature of the exhaust gas at least while it is determined that the state where the predetermined purification reaction is enabled is not reached. Thus, the warming-up of the catalyst can be accelerated.

According to yet another aspect of the present invention, the determination device performs the determination based on at least one of a difference between an oxygen concentration upstream of the catalyst and an oxygen concentration downstream of the catalyst, an estimate of the temperature of the catalyst estimated using an integration value of the temperature of the exhaust gas supplied to the catalyst and a flow rate of the exhaust gas and an actual measurement value of the temperature of the catalyst. Thus, it can be determined appropriately whether the catalyst has reached a state where the catalyst has the predetermined purification capacity.

BRIEF DESCRIPTION OF THE DRAWINGS

Features and advantages of an embodiment will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENT

Figure 1:
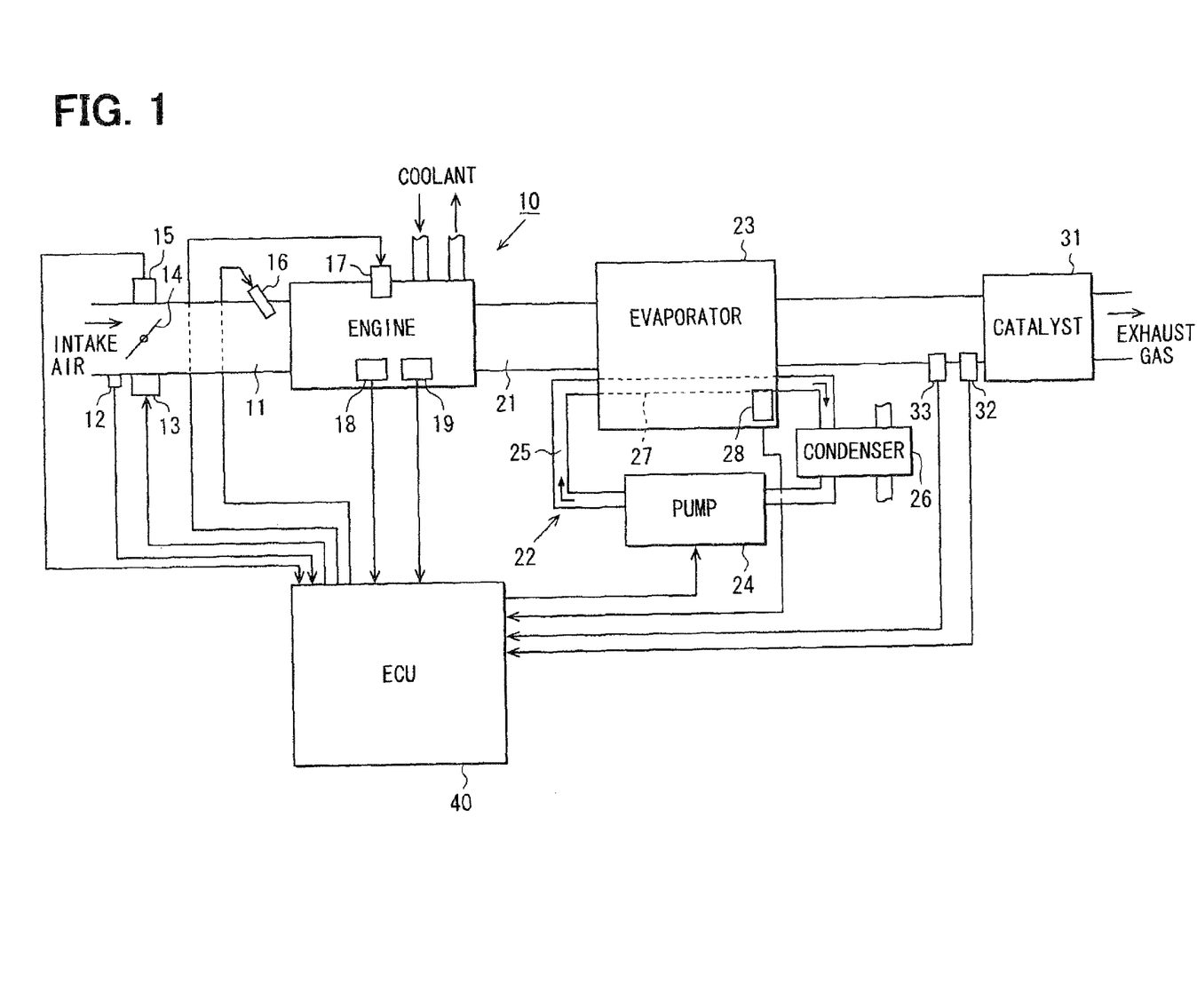
FIG. 1 is a schematic diagram showing an outline of a warming-up control device of a catalyst according to an embodiment of the present invention.

Hereafter, an embodiment of the present invention will be described with reference to the drawings. FIG. 1 is a diagram schematically showing a construction of a control system according to the present embodiment.

In an engine 10 shown in FIG. 1, an airflow meter 12 for sensing intake air quantity is provided upstream of an intake passage 11. A throttle valve 14 is provided downstream of the airflow meter 12. An opening degree of the throttle valve 14 (i.e., a throttle position) is regulated by a throttle actuator 13 such as a DC motor. The opening degree of the throttle valve 14 is sensed with a throttle position sensor 15 incorporated in the throttle actuator 13. An injector 16 for performing injection supply of fuel is mounted downstream of the throttle valve 14.

A mixture gas of air suctioned into the intake passage 11 and the fuel injected from the injector 16 is supplied to a combustion chamber of the engine 10 by an opening operation of an intake valve (not shown). The mixture gas supplied to the engine 10 is ignited by a spark plug 17 and is used in combustion. A crank angle sensor 18 is provided to the engine 10 to sense engine rotation speed and the like. The engine 10 is provided with a water jacket, to which a coolant circulating through a predetermined path is supplied. A coolant temperature sensor 19 for sensing temperature of the coolant circulating through the water jacket is provided to the engine 10.

The mixture gas used in the combustion in the combustion chamber of the engine 10 (i.e., exhaust gas) is discharged to an exhaust passage 21 by an opening operation of an exhaust valve (not shown), An evaporating section 23 (evaporator) of a heat recovery device 22 is provided in the exhaust passage 21.

The heat recovery device 22 is provided with a circulation passage 25 as a fluid passage, through which a working fluid such as ammonia or water circulates when an electric pump 24 operates. The evaporating section 23 as a heat absorbing section and a condensing section 26 (condenser) as a heat radiating section are provided at certain positions in the circulation passage 25. The evaporating section 23 incorporates a heat exchanger 27 arranged along a pipe wall of an exhaust pipe constituting the exhaust passage 21. The working fluid flowing through the circulation passage 25 absorbs heat from the exhaust gas through heat exchange with the exhaust gas while the working fluid passes through the heat exchanger 27. Thus, the working fluid changes from a condensate liquid state to a vapor state. A fluid temperature sensor 28 for actually measuring temperature of the working fluid is provided to an outlet section of the passage of the working fluid in the heat exchanger 27. The vaporized working fluid radiates the heat to the coolant of the engine 10 in the condensing section 26, thereby returning from the vapor state to the condensate liquid state.

By increasing the temperature of the coolant in the heat recovery device 22, the engine 10 can be warmed up quickly, for example, immediately after the engine 10 is started. Moreover, in the case where a vehicle compartment is heated with the coolant, the heating can be performed quickly. The object of the temperature increase performed by the heat recovery device 22 is not limited to the coolant. Alternatively, oil circulating through an automatic transmission, engine oil circulating through the engine 10 or the like may be employed as the object of the temperature increase.

A catalyst 31 having a three-way catalyst for purifying carbon monoxide (CO), hydrocarbon (HC) and nitrogen oxides (NOx) in the exhaust gas is provided downstream of the evaporating section 23 in the exhaust passage 21. A catalyst temperature sensor 32 for actually measuring temperature of the three-way catalyst is provided upstream of the catalyst 31. An air-fuel ratio sensor 33 for sensing an air-fuel ratio of the mixture gas (i.e., the exhaust gas as an object of the sensing) is provided between the catalyst 31 and the evaporating section 23 in the exhaust passage 21. The air-fuel ratio sensor 33 is constructed of a wide-area NF sensor of a limiting current type, for example. The air-fuel ratio sensor 33 outputs an air-fuel ratio sensing signal (an element current signal) in accordance with oxygen concentration or unburned components in the exhaust gas.

The control system has an ECU 40. The ECU 40 is mainly constructed of a microcomputer, which has CPU, ROM, RAM, a backup area and the like. Outputs of the above-described various sensors related to the engine 10 are inputted to the ECU 40. The ECU 40 executes various kinds of control programs stored in the ROM based on the output results of the various sensors to operate respective parts of the above-described control system in accordance with an operation state of the engine 10.

Next, warming-up control of the catalyst 31 will be explained.

Figure 2:
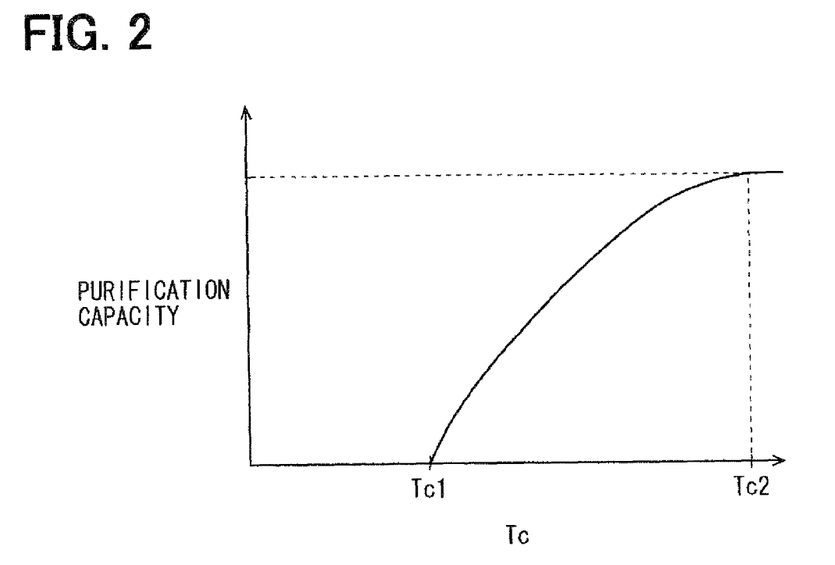
FIG. 2 is a diagram showing a relationship between temperature and a purification capacity of the catalyst according to the embodiment.

FIG. 2 shows a relationship between the temperature Tc of the catalyst 31 and a purification capacity of the catalyst 31. As shown in FIG. 2, the capability of the catalyst 31 to purify the exhaust gas is very low when the temperature Tc of the catalyst 31 is lower than Tc1 (for example, Tc1=300 degrees C.). When the temperature Tc of the catalyst 31 is equal to or higher than Tc1, the purification capacity increases as the temperature Tc increases. However, the purification capacity of the catalyst 31 is substantially constant when the temperature Tc of the catalyst 31 is equal to or higher than Tc2 (for example, Tc2=400 degrees C.). At this time, the catalyst 31 is in a thoroughly activated state. That is, as temperature dependency of the purification capacity, the catalyst 31 has a character that a range where an increase rate of the purification capacity with respect to the temperature increase is comparatively high is sandwiched between ranges where the increase rate is comparatively low. Tc1 is the temperature in the case where the range changes from the first range of the low increase rate to the range of the high increase rate. Tc2 is the temperature in the case where the range changes from the range of the high increase rate to the following range of the low increase rate, In the present embodiment, in order to warm up the catalyst 31 using the exhaust gas heat, exhaust control for increasing the temperature of the exhaust gas or fluctuating concentrations of an oxidizing agent and a reducing agent contained in the exhaust gas is performed in accordance with the temperature Tc of the catalyst 31. In the construction having the evaporating section 23 of the heat recovery device 22 upstream of the catalyst 31, flow control of the working fluid is also performed to reduce an influence of heat loss in the evaporating section 23 over the warming-up of the catalyst 31.

Figure 3:
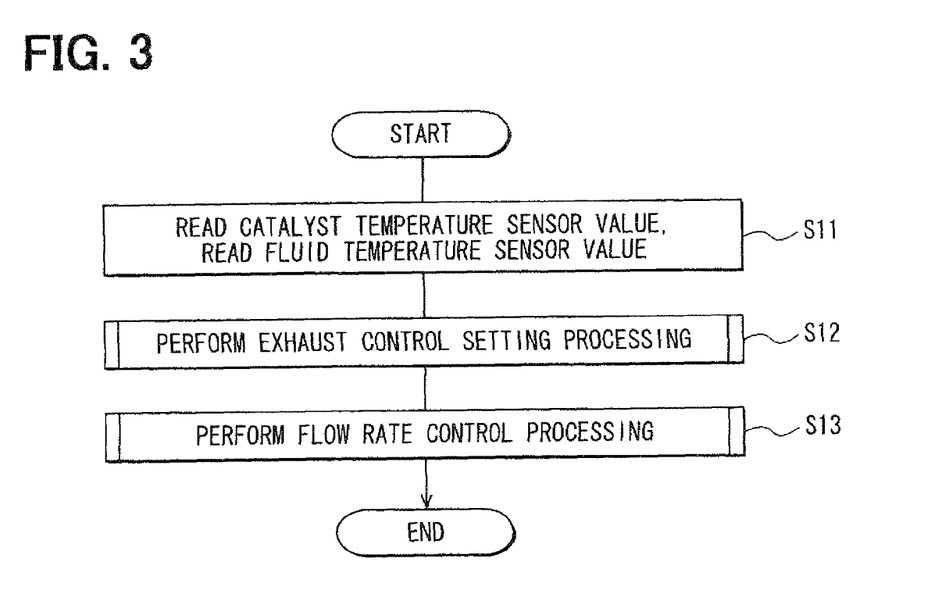
FIG. 3 is a flowchart showing catalyst warming-up processing according to the embodiment.

FIG. 3 shows catalyst warming-up processing. This processing is started periodically in the case where the temperature Tc sensed with the catalyst temperature sensor 32 is lower than Tc2 while the engine 10 is operating or in the case where the setting is made such that exhaust control for the warming-up is performed irrespective of whether the engine 10 is operating. The starting condition is not limited to the above-described conditions. Alternatively, for example, the processing may be started periodically in the case where the temperature of the coolant is lower than predetermined temperature.

In a series of processing, first in S11 (S means "Step"), the temperature Tc sensed with the catalyst temperature sensor 32 is read and the temperature sensed with the fluid temperature sensor 28 is read. Then, exhaust control setting processing is performed in S12 and flow rate control processing is performed in S13 Then, the series of processing is ended once.

Figure 4:
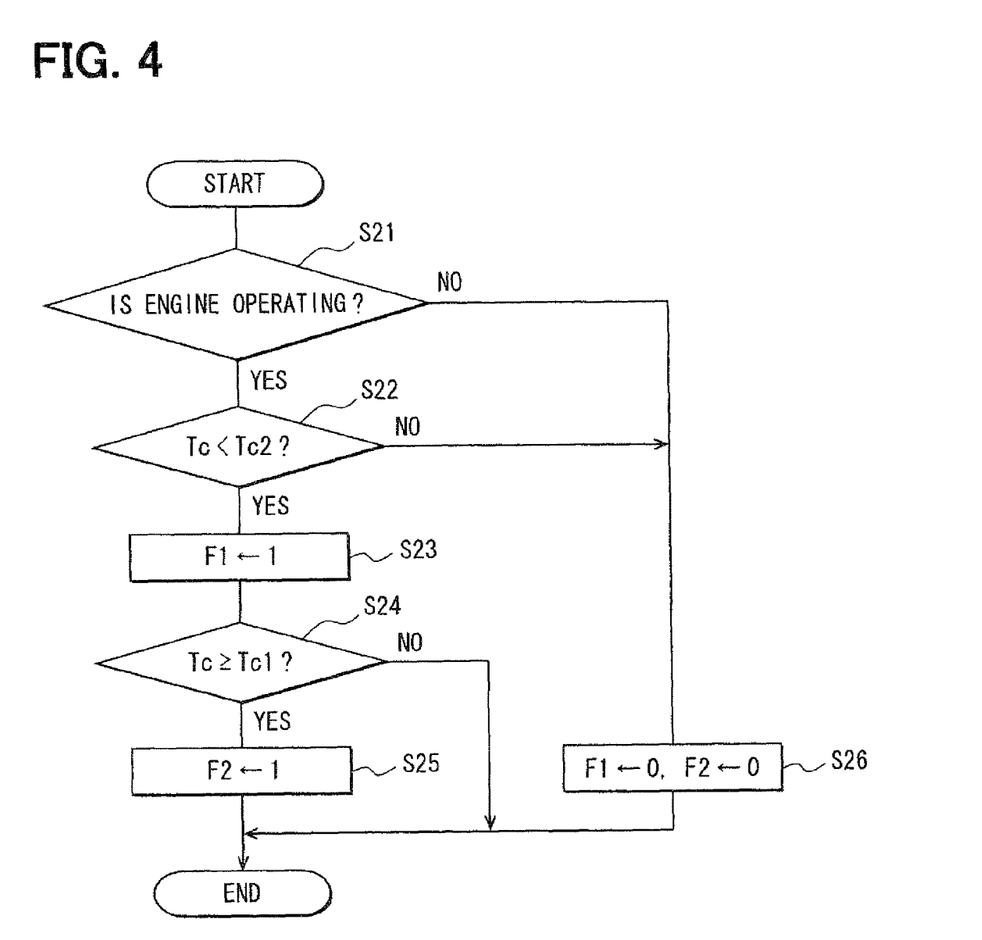
FIG. 4 is a flowchart showing exhaust control setting processing according to the embodiment.

FIG. 4 shows the exhaust control setting processing of S12.

In the exhaust control setting processing, first in S21, it is determined whether the engine 10 is operating based on the sensing result of the crank angle sensor 18. In S22, it is determined whether the temperature Tc sensed with the catalyst temperature sensor 32 is lower than the temperature Tc2, at which the catalyst 31 is thoroughly activated. "1" is set in a first exhaust control flag F1 (F1=1) in S23 if the engine 10 is operating and the temperature Tc is lower than Tc2.

If "1" is set in the first exhaust control flag F1, first exhaust control processing, which is set as separate processing (not shown), is performed repeatedly in a predetermined cycle. In the first exhaust control processing, processing for increasing an exhaust gas flow rate and processing for performing a delaying operation of ignition timing are performed to raise the temperature of the exhaust gas.

As the processing for increasing the exhaust gas flow rate, in the present embodiment, a target exhaust gas flow rate is calculated based on the temperature Tc of the catalyst 31, first. The target exhaust gas flow rate is set as map information individually for each of multiple segmented temperature ranges of the catalyst 31. An increase correction amount is calculated based on the rotation speed and the exhaust gas flow rate of each time, A target opening degree of the throttle valve 14 is calculated based on the calculated increase correction amount. Then, the throttle actuator 13 is operated to achieve the calculated opening degree of the throttle valve 14.

As the processing for performing the delaying operation of the ignition timing, in the present embodiment, the ignition timing is operated to perform feedback control for conforming the actual rotation speed of the engine 10 to target rotation speed. The delaying operation of the ignition timing, an operation for making the air-fuel ratio lean or the like can be performed to reduce torque when the target rotation speed is fixed and the exhaust gas flow rate is increased at the same time. In the present embodiment, the ignition timing is employed as an operated amount. It is because the delaying operation of the ignition timing can raise the exhaust temperature more effectively than the operation for making the air-fuel ratio lean though both of the operation for making the air-fuel ratio lean and the delaying operation of the ignition timing can raise the temperature of the exhaust gas. The first exhaust control processing is not limited to the above-mentioned processing. Concrete contents of the processing are arbitrary as long as the temperature of the exhaust gas can be raised by delaying the ignition timing.

Then, in S24, it is determined whether the temperature Tc sensed with the catalyst temperature sensor 32 is equal to or higher than the temperature Tc1, at which the catalyst 31 has a predetermined purification capacity (i.e., the temperature at which a predetermined purification reaction is enabled). When the temperature Tc is lower than Tc1, the processing is ended once. When the temperature Tc is equal to or higher than Tc1, "1" is set in a second exhaust control flag F2 (i.e., F2=1) in S25. Then, the processing is ended once.

If "1" is set in the second exhaust control flag F2, second exhaust control processing, which is set as separate processing (not shown), is repeatedly performed in a predetermined cycle. The second exhaust control processing is for fluctuating the concentrations of the oxidizing agent and the reducing agent contained in the exhaust gas, i.e., for performing dither control. More specifically, an amplitude w1 (%) of an operation for compulsorily oscillating the air-fuel ratio between the lean state and the rich state with respect to the theoretical air-fuel ratio is calculated based on the temperature Tc sensed with the catalyst temperature sensor 32. The amplitude w1 indicates a degree of making the air-fuel ratio rich or lean as compared to the theoretical air-fuel ratio (=14.7). The amplitude w1 is used to compulsorily oscillate the target air-fuel ratio between a value "(1+w1/100)×14.7" and a value "(1−w1/100)×14.7." In the present embodiment, in order to cause the lean state and the rich state in the adjacent fuel injection operations respectively, the air-fuel ratio is oscillated between the lean state and the rich state alternately between the adjacent fuel injection operations.

The amplitude w1 is set as map information individually for each of multiple segmented temperature ranges of the catalyst 31. The map information is set such that the amplitude w1 remains "0" until the temperature Tc of the catalyst 31 increases up to Tc1 and such that the amplitude w1 increases as the temperature Tc of the catalyst 31 increases when the temperature Tc is equal to or higher than Tc1. It is because the purification capacity of the catalyst 31 increases as the temperature Tc of the catalyst 31 increases when the temperature Tc is equal to or lower than Tc2 as shown in FIG. 2. That is, in the case where the catalyst 31 is warmed up with the use of the reaction heat in the catalyst 31, the catalyst 31 can be warmed up more quickly as the reaction heat amount increases. However, if the carbon monoxide and the like exceeding the purification capacity of the catalyst 31 are discharged to the catalyst 31, the carbon monoxide and the like are not purified fully by the catalyst 31 and do not contribute to the increase of the reaction heat amount. Rather, there is a possibility that the exhaust characteristic downstream of the catalyst 31 is deteriorated. Therefore, the amplitude w1 is increased in accordance with the increase of the temperature Tc of the catalyst 31 such that the carbon monoxide and the like of the quantities commensurate with the purification capacity of the catalyst 31 are discharged. Thus, the reaction heat amount in the catalyst 31 is maximized while avoiding the deterioration of the exhaust characteristic.

In the second exhaust control processing, the target air-fuel ratio is calculated using the above-described amplitude w1, and feedback control of the air-fuel ratio for calculating the fuel injection quantity from the target air-fuel ratio and the actual air-fuel ratio calculated based on the sensing result of the air-fuel ratio sensor 33 is performed. The fuel injection from the injector 16 is performed in accordance with the calculated fuel injection quantity. The situation where "1" is set in the first exhaust control flag F1 is maintained even in a situation where "1" is set in the second exhaust control flag F2. Therefore, the execution of the first exhaust control processing is continued even when the execution of the second exhaust control processing is started. The configuration of fluctuating the amplitude w1 is not indispensable. Alternatively, the amplitude w1 may be fixed.

If it is determined that the engine 10 is not operating in S21 of the exhaust control setting processing or if it is determined in S22 that the temperature Tc sensed with the catalyst temperature sensor 32 is equal to or higher than Tc2, "0" as an initial value is set in both of the first exhaust control flag F1 and the second exhaust control flag F2 in S26 (F1=0 and F2=0) and then the processing is ended once. Thus, the first exhaust control processing and the second exhaust control processing are not performed thereafter.

Figure 5:
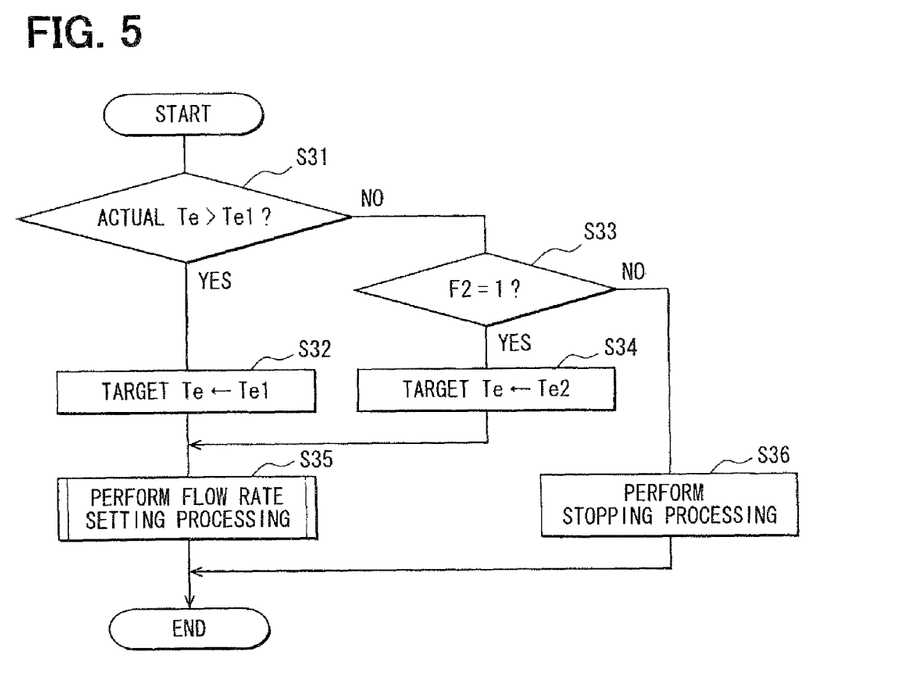
FIG. 5 is a flowchart showing flow rate control processing according to the embodiment.

FIG. 5 shows the flow rate control processing in S13 of FIG. 3. Processing for controlling the flow rate of the working fluid when the temperature Tc of the catalyst 31 is equal to or higher than Tc2 is set separately from the flow rate control processing of FIG. 5.

In the flow rate control processing, first in S31, it is determined whether the temperature Te sensed with the fluid temperature sensor 28 is higher than Te1, which is first target outlet temperature. As described above, the exhaust gas heat recovery in the heat recovery device 22 is performed via the working fluid flowing through the inside of the heat exchanger 27. The pressure of the working fluid increases as the temperature of the working fluid increases when the working fluid recovers the heat in the heat exchanger 27. As the pressure increases, a force for expanding the heat exchanger 27 outward and a force for separating connections between the heat exchanger 27 and other devices increase. Te1 is set as upper limit temperature of a range, in which the heat exchanger 27 and the above-described connections are not damaged, based on materials and structure of the heat exchanger 27 and strength of the connections.

When the temperature Te is higher than Te1, the target outlet temperature is set at Te1 in S32. When the temperature Te is not higher than Te1, it is determined in S33 whether "1" is set in the second exhaust control flag F2. When "1" is set in the second exhaust control flag F2 (i.e., when the second exhaust control processing is performed), the target outlet temperature is set at Te2, which is second target outlet temperature, in S34.

Te2 is the target outlet temperature for bringing the state of the exhaust gas heat recovery to a normal recovery state and is set in accordance with target temperature of the coolant, which is the object of the temperature increase, The actual temperature of the coolant sensed with the coolant temperature sensor 19 fluctuates and the temperature of the working fluid necessary for conforming the temperature of the coolant to the target temperature also fluctuates in accordance with the actual temperature of the coolant, The ECU 40 calculates Te2 using a deviation of the actual temperature of the coolant from the target temperature of the coolant in separate processing (not shown) repeatedly executed in a predetermined cycle. The temperature of the oil of the automatic transmission, the engine oil or the like also changes in accordance with the operation state. Therefore, also in the case where the oil of the automatic transmission, the engine oil or the like is the object of the temperature increase, Te2 is calculated using the above-described deviation, As described above, Te2 as the second target outlet temperature is set as temperature desirable for increasing the temperature of the object of the temperature increase. In this case, the target temperature of the coolant as the object of the temperature increase fluctuates near 70 degrees C. in accordance with the operation state or required heat amount for the heating. In the case of the oil of the automatic transmission, the target temperature of the oil fluctuates near 120 degrees C. in accordance with the operation state. Therefore, Te2 fluctuates in a range higher than these temperatures by tens of degrees C. Te1 as the first target outlet temperature is set as the upper limit temperature of the range where the heat exchanger 27 and the connections thereof are not damaged, Te1 is invariably higher than Te2 even when Te2 fluctuates.

Figure 6:
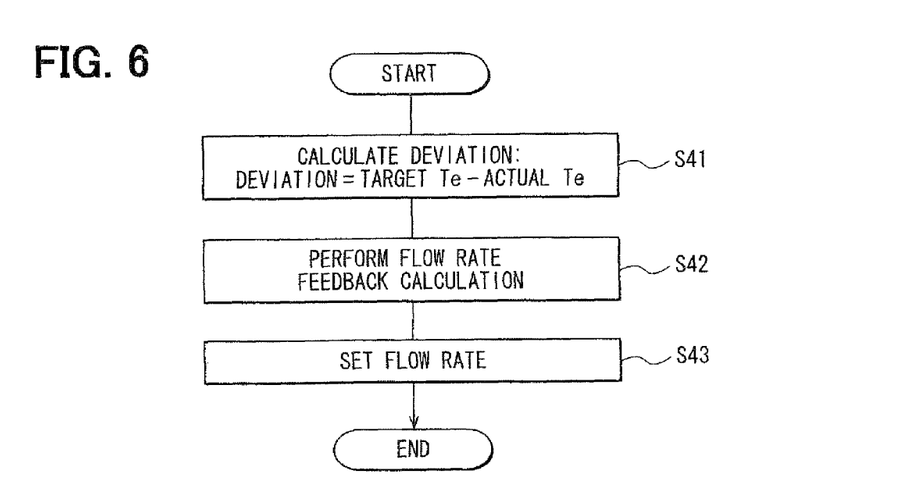
FIG. 6 is a flowchart showing flow rate setting processing according to the embodiment.

After the processing of S32 or S34 is performed in the flow rate control processing, flow rate setting processing is performed in S35. In the flow rate setting processing shown in FIG. 6, first in S41, the deviation of the actual outlet temperature Te from the set target outlet temperature Te is calculated. In following S42, feedback calculation such as PID calculation or Pi calculation is performed using the deviation calculated in S41, thereby calculating a target flow rate. Then, in S43, the output of the electric pump 24 in the heat recovery device 22 is set to conform the actual flow rate of the working fluid to the flow rate calculated in S42. After the flow rate setting processing is performed, the flow rate control processing is ended once. The subroutine of the flow rate setting processing is used also in the processing separately set for the situation where the temperature Tc of the catalyst 31 is equal to or higher than Tc2 for controlling the flow rate of the working fluid.

When the temperature Te sensed with the fluid temperature sensor 28 is not higher than Te1 (S31=NO) and "1" is not set in the second exhaust control flag F2 (S33=NO), the electric pump 24 is stopped in S36 to stop the circulation of the working fluid caused by the output of the electric pump 24. Thus, the working fluid becomes more prone to stay in the heat exchanger 27, so the outlet temperature Te increases. The control object of the ECU 40 concerning the control of the flow rate of the working fluid is not limited to the electric pump 24. Alternatively, in a construction having an on-off valve in the circulation passage 25, the flow rate may be controlled by adjusting an opening degree of the on-off valve.

Figure 7:
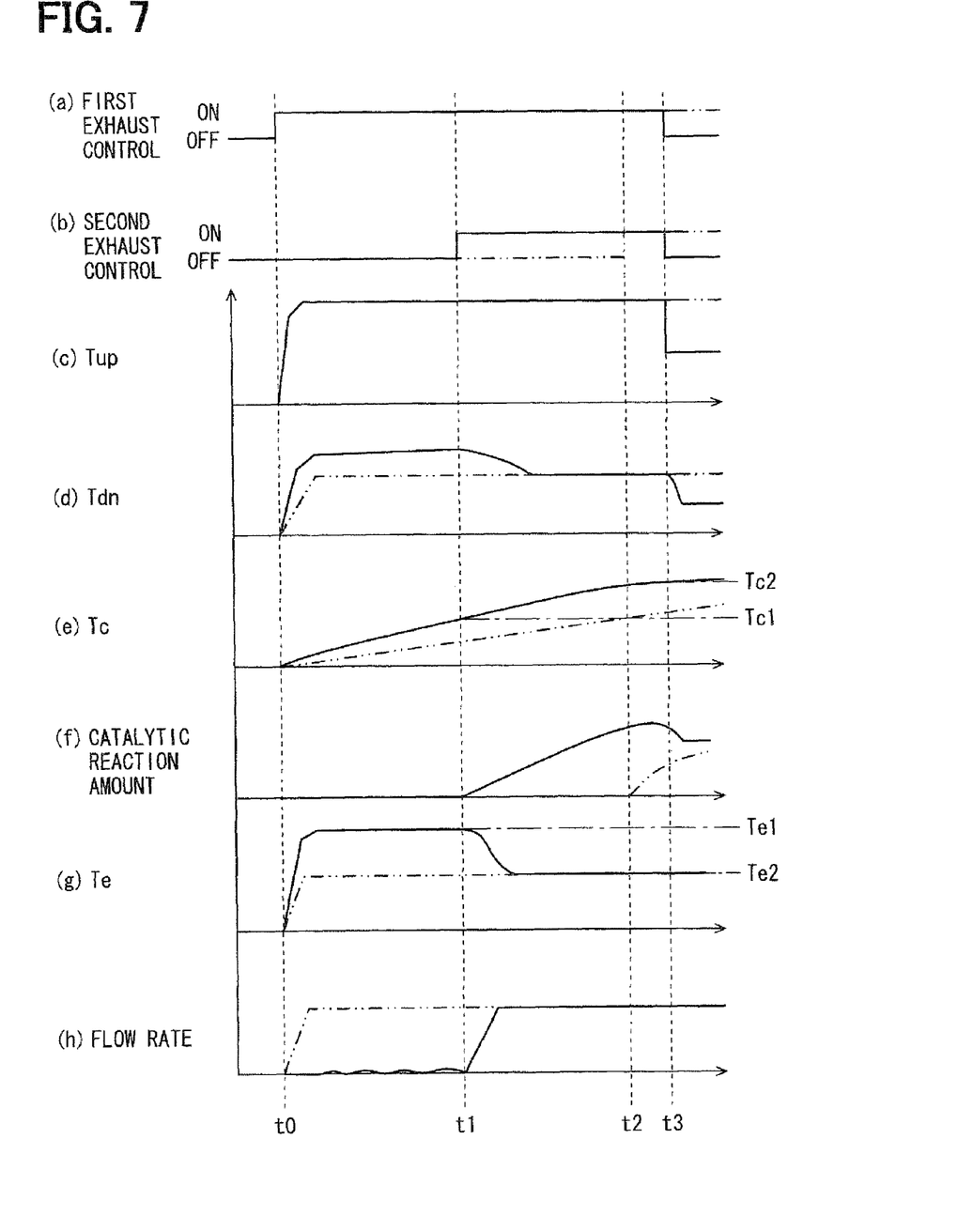
FIG. 7 is a timing chart showing states of exhaust control processing and transitions of parameters during the catalyst warming-up processing according to the embodiment.

FIG. 7 is a timing chart showing states of the first exhaust control processing and the second exhaust control processing and transitions of respective parameters in the case where the processing of FIGS. 3 to 6 is performed. Part (a) of FIG. 7 shows an ON state and an OFF state of the first exhaust control processing. Part (b) of FIG. 7 shows an ON state and an OFF state of the second exhaust control processing. Part (c) of FIG. 7 shows exhaust temperature Tup upstream of the evaporating section 23. Part (d) of FIG. 7 shows the exhaust temperature Tdn downstream of the evaporating section 23. Part (e) of FIG. 7 shows the catalyst temperature Tc. Part (f) of FIG. 7 shows the catalytic reaction amount. Part (g) of FIG. 7 shows the outlet temperature Te of the heat exchanger 27. Part (h) of FIG. 7 shows the flow rate of the working fluid. In FIG. 7, chain double-dashed lines show an operation mode of a system of a comparative example, which does not perform the restriction of the flow of the working fluid. Solid lines in FIG. 7 show an operation mode of the present embodiment, If the engine 10 is started at timing t0 as shown in FIG. 7, the system according to the present embodiment starts the first exhaust control processing as shown in Part (a) and starts the restriction of the flow rate of the working fluid as shown in Part (h). The exhaust temperature Tup rises rapidly as shown in Part (c) based on the start of the first exhaust control processing. The temperature Te of the working fluid at the outlet section of the heat exchanger 27 rises rapidly based on the restriction of the flow rate of the working fluid as shown in Part (g) as compared with the case where the restriction of the flow rate of the working fluid is not performed. In this case, the temperature Te of the working fluid at the outlet section of the heat exchanger 27 makes a transition, the upper limit of which is the first target outlet temperature Te1. The temperature Te1 is higher than the second target outlet temperature Te2, which is the temperature at the time of the normal heat recovery. Thus, the exhaust gas heat recovery in the heat exchanger 27 is suppressed. Accordingly, as shown in Part (e), the catalyst temperature Tc rises quickly and the catalyst 31 is warmed quickly as compared with the comparative example that does not perform the flow rate restriction of the working fluid.

Thereafter, when the catalyst temperature Tc reaches Tc1 at timing t1, the second exhaust control processing is started as shown in Part (b) and the flow rate restriction of the working fluid is canceled as shown in Part (h). Based on the processing, the catalytic reaction amount increases rapidly as shown in Part (f) and the temperature Te of the working fluid at the outlet section of the heat exchanger 27 falls toward Te2, which is the second target outlet temperature, as shown in Part (g). In this case, since the normal heat recovery is started in the heat exchanger 27, the exhaust temperature Tdn downstream of the evaporating section 23 becomes lower than the exhaust temperature Tup upstream of the evaporating section 23 as shown in Parts (c) and (d). However, since the catalytic reaction amount increases rapidly based on the start of the second exhaust control processing as mentioned above, the catalyst temperature Tc continues to rise as shown in Part (e). In contrast, in the system of the comparative example, the catalyst temperature Tc has not reached Tc1 at the timing t1 but reaches Tc1 at timing of t2 after the timing t1.

Thereafter, in the system according to the present embodiment, the catalyst temperature Tc reaches Tc2 at timing t3, so the first exhaust control processing and the second exhaust control processing are ended as shown in Parts (a) and (b). In contrast, in the system of the comparative example, the catalyst temperature Tc has not reached Tc2 at the timing t3, so the exhaust control processing is continued.

The present embodiment described above exerts following effects.

In the system having the evaporating section 23 of the heat recovery device 22 upstream of the catalyst 31 in the exhaust passage 21, the exhaust control for compulsorily oscillating the air-fuel ratio between the lean state and the rich state is performed when the temperature of the catalyst 31 reaches certain temperature, at which the catalyst 31 exerts the predetermined purification capacity, and the flow of the working fluid in the heat recovery device 22 is restricted until the certain temperature is reached. Thus, the recovery of the exhaust gas heat is suppressed until the warming-up of the catalyst 31 using the reaction heat is started, so the warming-up of the catalyst 31 using the exhaust gas heat can be prioritized. In the case where the warming-up using the reaction heat is started, even if the temperature of the exhaust gas supplied to the catalyst 31 decreases because of the recovery of the exhaust gas heat, the influence over the warming-up of the catalyst 31 can be reduced. The construction according to the present embodiment controls the flow rate of the working fluid to prioritize the warming-up of the catalyst 31. Therefore, no restriction is imposed on the passage construction of the exhaust passage 21 to prioritize the warming-up of the catalyst 31.

The above-described restriction is canceled and the normal heat recovery is performed when the temperature of the catalyst 31 reaches the temperature, at which the catalyst 31 has the predetermined purification capacity, instead of restricting the flow of the working fluid until the catalyst 31 is fully activated. Thus, as compared with the construction that continues the restriction of the flow of the working fluid until the catalyst 31 is fully activated, the start timing of the exhaust gas heat recovery in the heat recovery device 22 does not delay extremely. Moreover, the burden on the heat exchanger 27 and the connections of the heat exchanger 27 can be reduced In the case where the flow of the working fluid is restricted, the burden is reduced also with the construction that controls the flow rate to conform the temperature Te at the outlet section of the heat exchanger 27 to Te1. The reduction of the burden exerts the effect of suppressing the occurrence of the damage to the heat exchanger 27 and the connections of the heat exchanger 27 Moreover, the reduction of the burden eliminates the necessity to extremely increase the strength of the heat exchanger 27 and the connections of the heat exchanger 27. Accordingly, the above-described outstanding effects can be exerted while simplifying the construction of the heat exchanger 27 and the like and reducing the cost.

During the normal heat recovery, the temperature of the object of the temperature increase performed by the heat recovery device 22 can be controlled appropriately by using the temperature of the working fluid as the reference. In this case, the above-described effects can be exerted with the construction at the time of the normal heat recovery by using the temperature of the working fluid as the reference when restricting the flow of the working fluid.

In the case where the flow of the working fluid is restricted, the flow of the working fluid is stopped when the temperature Te at the outlet section of the heat exchanger 27 is equal to or lower than Te1. Thus, in the construction that can suppress the burden on the heat exchanger 27 and the like to the predetermined range, the warming-up of the catalyst 31 can be prioritized by restricting the heat recovery by the working fluid to the minimum.

The present invention is not limited to the above-described embodiment but may be implemented as follows, for example.

In the case where the flow of the working fluid is restricted, instead of restricting the flow rate such that the temperature at the outlet section of the heat exchanger 27 becomes equal to or lower than the limit value, the flow rate may be restricted such that internal pressure at the outlet section of the heat exchanger 27 becomes equal to or lower than a limit value. The burden on the heat exchanger 27 and the like increases as the internal pressure of the working fluid increases. Therefore, the burden can be suppressed to a predetermined range by using the internal pressure as the reference. When the internal pressure is used as the reference, the internal pressure of the working fluid may be actually measured by providing an internal pressure sensor in the heat exchanger 27. Alternatively, an estimate of the internal pressure may be obtained by using the temperature of the working fluid in the heat exchanger 27 as a parameter.

When the flow of the working fluid is restricted, instead of using the actual measurement value as the temperature of the working fluid at the outlet section of the heat exchanger 27, the estimate of the temperature may be used. For example, the estimate of the temperature of the working fluid may be obtained by using the exhaust temperature upstream of the evaporating section 23 and a parameter decided from the material and the structure of the heat exchanger 27.

When the flow of the working fluid is restricted to prioritize the warming-up of the catalyst 31, the flow of the working fluid may be stopped continuously until the temperature of the catalyst 31 reaches Tc as the temperature at which the catalyst 31 has the predetermined purification capacity, However, in consideration of the burden on the heat exchanger 27 and the like, the flow rate should be preferably controlled in the range where the temperature (or the internal pressure) of the working fluid in the heat exchanger 27 becomes equal to or lower than the limit value as in the above-described embodiment.

In the situation where the flow of the working fluid is restricted, the timing for canceling the restriction is not limited to the timing when the temperature of the catalyst 31 reaches the temperature Tc1, at which the catalyst 31 has the predetermined purification capacity. For example, the restriction may be cancelled when the temperature of the catalyst 31 reaches certain temperature Tc3 higher than the temperature Tc1 at which the catalyst 31 obtains the predetermined purification capacity and lower than the temperature Tc2 at which the catalyst 31 is activated (Tc1<Tc3<Tc2). More specifically, instead of determining whether "1" is set in the second exhaust control flag F2 in S33 of the flow rate control processing of FIG. 5, it is determined whether the temperature of the catalyst 31 is Tc3 that is higher than Tc1 and is lower than Tc2. When the temperature is Tc3, the target outlet temperature is set at Te2 in S34. If the restriction is canceled at the timing when the temperature of the catalyst 31 reaches Tc1, there is a possibility that the temperature of the catalyst 31 rises to Tc1 once but falls below Tc1 thereafter because of the fall of the exhaust temperature accompanying the recovery of the exhaust gas heat before the warming-up of the catalyst 31 using the reaction heat is started so the warming-up of the catalyst 31 using the reaction heat is not performed suitably. If the restriction is canceled at the timing after the timing when the temperature Tc1 is reached, the warming-up of the catalyst 31 using the reaction heat can be started suitably.

In order to perform such the warming-up suitably, an operation for raising the exhaust temperature more than ever may be performed at the timing of Tc1 in the warming-up using the exhaust gas heat while using the timing of Tc1 as the timing for canceling the restriction, instead of setting the timing for canceling the restriction of the flow of the working fluid as the timing after the timing of Tc1.

In the above-described embodiment, the flow rate of the working fluid is controlled such that the normal heat recovery is started when the temperature of the catalyst 31 reaches the temperature Tc1 at which the catalyst 31 obtains the predetermined purification capacity. Alternatively, the target value of the temperature (or the internal pressure) of the working fluid in the heat exchanger 27 may be reduced stepwise while a control state changes from a state where the flow of the working fluid is restricted to a state where the normal heat recovery is started. Also in this case, the warming-up using the reaction heat of the catalyst 31 can be started suitably.

The timing for starting the second exhaust control processing may be set at timing when the temperature of the catalyst 31 becomes slightly higher than Tc1. Also in this case, the timing for canceling the restriction of the flow of the working fluid should be preferably set at timing that is the same as or later than the start timing of the second exhaust control processing and that precedes the timing when the catalyst 31 reaches the activated state.

In order for the heat recovery device 22 to recover the exhaust gas heat more efficiently than in the case where the heat recovery device 22 is provided downstream of the catalyst 31, the evaporating section 23 of the heat recovery device 22 may be arranged at the same position as the catalyst 31 with respect to the flow direction of the exhaust gas. For example, the evaporating section 23 of the heat recovery device 22 may be integrated with the catalyst 31. Also in this case, the warming-up of the catalyst 31 should be preferably performed quickly and therefore the construction that performs the exhaust control or the restriction of the flow of the working fluid according to the above-described embodiment should be preferably applied.

The construction that performs the exhaust control or the restriction of the flow of the working fluid according to the above-described embodiment may be applied to a hybrid car that is mounted with both of an engine and a motor alternator and that performs recovery of exhaust gas heat at a position of a catalyst or upstream of the catalyst in an exhaust passage. The hybrid car is switched between drive with the engine and drive with the motor alternator in accordance with an operation state. The catalyst warming-up processing according to the above-described embodiment may be performed if the temperature of the catalyst is low when the car is switched to the drive with the engine. A construction that starts the engine in the situation where the drive with the motor alternator is performed and that performs the catalyst warming-up processing according to the above-described embodiment may be employed.

A construction that does not perform the first exhaust control processing corresponding to the warming-up of the catalyst 31 performed by increasing the exhaust temperature may be employed. Even in the case of the construction that performs the first exhaust control processing, the present invention is not limited to the construction that performs the delay operation of the ignition timing by the first exhaust control processing, For example, a construction performing an operation for making the air-fuel ratio lean or an operation for raising target rotation speed may be employed. Alternatively, for example, in the case of a direct injection engine, the fuel injection may be performed in an expansion stroke.

The second exhaust control processing corresponding to the warming-up scheme for warming up the catalyst 31 using the reaction heat of the catalyst 31 is not limited to the dither control. Alternatively, processing using a secondary air may be employed as the second exhaust control processing. The present invention may be applied to a system that does not use the three-way catalyst but a catalyst for nitrogen oxides or the like as the catalyst 31.

The determination whether the catalyst 31 has reached the state where the catalyst 31 has the predetermined purification capacity in accordance with the temperature increase in the range where the catalyst 31 has not reached the activated state is not limited to the determination whether the temperature of the catalyst 31 is equal to or higher than the predetermined temperature, at which the catalyst 31 has the predetermined purification capacity, based on the actual measurement value of the temperature of the catalyst 31. Alternatively, for example a construction that determines whether the temperature is equal to or higher than the predetermined temperature at which the catalyst 31 has the predetermined purification capacity based on an estimate of the temperature of the catalyst 31 calculated from an integration value of the temperature of the exhaust gas supplied to the catalyst 31 and the exhaust gas flow rate per unit time may be employed. Alternatively, it may be determined whether the catalyst 31 has reached the state where the catalyst 31 has the predetermined purification capacity based on a difference between an oxygen concentration upstream of the catalyst 31 and an oxygen concentration downstream of the catalyst 31. In this case, the above determination is performed by using the phenomenon that synchronism between the oxygen concentration upstream of the catalyst 31 and the oxygen concentration downstream of the catalyst 31 is lost if the catalyst 31 reaches the state where the catalyst 31 has the predetermined purification capacity.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A warming-up control device of a catalyst applied to an engine system having a heat recovery device that circulates a working fluid through a predetermined circulation passage and that recovers exhaust gas heat via the working fluid at the same position as the catalyst or upstream of the catalyst in an exhaust passage of an engine, the heat recovery device supplies the recovered heat to a temperature increase object, the warming-up control device comprising:
- a determination means for determining whether a predetermined state, in which the catalyst performs a predetermined purification reaction, is reached in a process of activation of the catalyst;
- a first control means for promoting a reaction in the catalyst to increase a catalytic reaction heat when the determination means determines that the predetermined state is reached; and
- a second control means for controlling the flow of the working fluid in the heat recovery device, wherein the second control means restricts the flow of the working fluid in the heat recovery device to reduce an amount of heat recovered by the heat recovery device below a required amount of heat, which needs to be recovered by the heat recovery device to raise a temperature of the temperature increase object to a predetermined temperature, when the determination means determines that the predetermined state is not reached, wherein:
- when the determination means determines that the predetermined state is not reached, the second control means restricts the flow of the working fluid by restricting the flow rate of the working fluid such that one of a temperature and a pressure of the working fluid at a heat recovery point in the circulation passage becomes equal to or lower than a limit value thereof, which is set in accordance with strength of the circulation passage at the heat recovery point; and
- the second control means starts control of the flow rate of the working fluid such that the one of the temperature and the pressure of the working fluid at the heat recovery point is adjusted to a predetermined target value, which is lower than the limit value, through circulation of the working fluid during a predetermined time period that is from a time point, at which the determination means determines that the predetermined state is reached, until a time point, at which the catalyst reaches an activated state of the catalyst so that the circulation of the working fluid during the predetermined time period is started before the time point at which the catalyst reaches the activated state of the catalyst.

2. The warming-up control device as in claim 1, wherein the second control means stops the flow of the working fluid when the one of the temperature and the pressure of the working fluid at the heat recovery point is equal to or lower than the limit value.

3. The warming-up control device as in claim 1, wherein the second control means stops the flow of the working fluid when the determination means determines that the predetermined state is not reached.

4. The warming-up control device as in claim 1, wherein the second control means switches from a state where the flow of the working fluid is restricted to a state where the flow of the working fluid is not restricted during the predetermined time period.

5. The warming-up control device as in claim 4, wherein the second control means switches from a state where the flow of the working fluid is restricted to a state where the flow of the working fluid is not restricted at timing after the first control means switches from a state before the reaction in the catalyst is promoted to a state where the reaction in the catalyst is promoted.

6. The warming-up control device as in claim 1, further comprising:
- a third control means for raising the temperature of the exhaust gas when the determination means determines that the predetermined state is not reached.

7. The warming-up control device as in claim 1, wherein the determination means determines whether the predetermined state is reached based on at least one of:
- a difference between an oxygen concentration on an upstream side of the catalyst and an oxygen concentration on a downstream side of the catalyst;
- an estimate of the temperature of the catalyst, which is estimated using an integration value of the temperature of the exhaust gas supplied to the catalyst and a flow rate of the exhaust gas; and
- an actual measurement value of the temperature of the catalyst.

8. The warming-up control device as in claim 1, wherein the predetermined circulation passage is different from a circulation passage, which is provided to the engine to cool the engine.

9. A warming-up control device of a catalyst applied to an engine system having a heat recovery device that circulates a working fluid through a predetermined circulation passage and that recovers exhaust gas heat via the working fluid at the same position as the catalyst or upstream of the catalyst in an exhaust passage of an engine, the heat recovery device supplies the recovered heat to a temperature increase object, the warming-up control device comprising:
- a determination means for determining whether a predetermined state, in which the catalyst performs a predetermined purification reaction, is reached in a process of activation of the catalyst;
- a first control means for promoting a reaction in the catalyst to increase a catalytic reaction heat when the determination means determines that the predetermined state is reached; and
- a second control means for controlling the flow of the working fluid in the heat recover device, wherein the second control means restricts the flow of the working fluid in the heat recovery device to reduce an amount of heat recovered by the heat recovery device below a required amount of heat, which needs to be recovered by the heat recovery device to raise a temperature of the temperature increase object to a predetermined temperature, when the determination means determines that the predetermined state is not reached, wherein:
- the second control means switches from a state where the flow of the working fluid is restricted to a state where the flow of the working fluid is not restricted during a predetermined time period that is from a time point, at which the determination means determines that the predetermined state is reached, until a time point, at which the catalyst reaches an activated state of the catalyst so that the circulation of the working fluid during the predetermined time period is started before the time point at which the catalyst reaches the activated state of the catalyst.

10. The warming-up control device as in claim 9, wherein when the determination means determines that the predetermined state is not reached, the second control means restricts the flow of the working fluid by restricting the flow rate of the working fluid such that one of a temperature and a pressure of the working fluid at a heat recovery point in the circulation passage becomes equal to or lower than a limit value thereof, which is set in accordance with strength of the circulation passage at the heat recovery point.

11. The warming-up control device as in claim 10, wherein the second control means stops the flow of the working fluid when the one of the temperature and the pressure of the working fluid at the heat recovery point is equal to or lower than the limit value.

12. The warming-up control device as in claim 10, wherein the second control means starts control of the flow rate of the working fluid such that the one of the temperature and the pressure of the working fluid at the heat recovery point is adjusted to a predetermined target value, which is lower than the limit value, through circulation of the working fluid during the predetermined time period.

13. The warming-up control device as in claim 9, wherein the second control means stops the flow of the working fluid when the determination means determines that the predetermined state is not reached.

14. The warming-up control device as in claim 9, wherein the second control means switches from a state where the flow of the working fluid is restricted to a state where the flow of the working fluid is not restricted at timing after the first control means switches from a state before the reaction in the catalyst is promoted to a state where the reaction in the catalyst is promoted.

15. The warming-up control device as in claim 9, further comprising:
a third control means for raising the temperature of the exhaust gas when the determination means determines that the predetermined state is not reached.

16. The warming-up control device as in claim 9, wherein the determination means determines whether the predetermined state is reached based on at least one of:
a difference between an oxygen concentration on an upstream side of the catalyst and an oxygen concentration on a downstream side of the catalyst;
an estimate of the temperature of the catalyst, which is estimated using an integration value of the temperature of the exhaust gas supplied to the catalyst and a flow rate of the exhaust gas; and
an actual measurement value of the temperature of the catalyst.

17. The warming-up control device as in claim 9, wherein the predetermined circulation passage is different from a circulation passage, which is provided to the engine to cool the engine.

* * * * *